United States Patent
Benedetto et al.

(10) Patent No.: US 10,988,850 B2
(45) Date of Patent: Apr. 27, 2021

(54) ELECTRODIC SUPPORT STRUCTURE FOR COAXIAL ELECTROLYTIC CELLS

(71) Applicant: INDUSTRIE DE NORA S.P.A., Milan (IT)

(72) Inventors: Mariachiara Benedetto, Milan (IT); Elena Carminati, Milan (IT)

(73) Assignee: INDUSTRIE DE NORA S.P.A., Milan (IT)

( * ) Notice: Subject to any disclaimer, the term of this patent is extended or adjusted under 35 U.S.C. 154(b) by 0 days.

(21) Appl. No.: 16/344,849

(22) PCT Filed: Dec. 5, 2017

(86) PCT No.: PCT/IB2017/057644
§ 371 (c)(1),
(2) Date: Apr. 25, 2019

(87) PCT Pub. No.: WO2018/104855
PCT Pub. Date: Jun. 14, 2018

(65) Prior Publication Data
US 2020/0063278 A1     Feb. 27, 2020

(30) Foreign Application Priority Data

Dec. 6, 2016    (IT) .................. 102016000123656

(51) Int. Cl.
*C25B 15/08*      (2006.01)
*C25B 9/19*       (2021.01)
(Continued)

(52) U.S. Cl.
CPC ............. *C25B 15/08* (2013.01); *C25B 9/19* (2021.01); *C25B 9/63* (2021.01); *C25B 11/02* (2013.01);
(Continued)

(58) Field of Classification Search
CPC .................................. C25B 13/02; C25C 7/04
See application file for complete search history.

(56) References Cited

U.S. PATENT DOCUMENTS

| 4,113,601 A | 9/1978 | Spirig |
| 4,822,472 A * | 4/1989 | Reis ................ C02F 1/46109 |
| | | 204/276 |

(Continued)

FOREIGN PATENT DOCUMENTS

| WO | 2004097072 A1 | 11/2004 |
| WO | 2013189670 A1 | 12/2013 |
| WO | 2015082527 A1 | 6/2015 |

OTHER PUBLICATIONS

International Search Report and Written Opinion for Corresponding International Application No. PCT/IB2017/057644 (dated Feb. 22, 2018) (10 Pages).

(Continued)

*Primary Examiner* — Ciel P Contreras
(74) *Attorney, Agent, or Firm* — Lucas & Mercanti, LLP

(57) ABSTRACT

An electrodic support structure for coaxial electrolytic cells suitable for operating in both monopolar and bipolar configuration is provided. The electrode support structure has a support plane made of an isolating material provided with a plurality of housing seats suitable for housing a plurality of electrodes arranged homothetically to each other, and a partition member made of insulating material, provided with a plurality of electrode positioning means, integral with or mechanically connected to the support plane and arranged orthogonally thereto.

8 Claims, 6 Drawing Sheets

(51) Int. Cl.
  *C25C 7/04* (2006.01)
  *C25B 13/02* (2006.01)
  *C25B 11/02* (2021.01)
  *C25C 7/02* (2006.01)
  *C25B 9/63* (2021.01)

(52) U.S. Cl.
  CPC ............... *C25B 13/02* (2013.01); *C25C 7/02* (2013.01); *C25C 7/04* (2013.01)

(56) References Cited

U.S. PATENT DOCUMENTS

| | | | |
|---|---|---|---|
| 5,348,683 A * | 9/1994 | Kaczur | B01J 19/2475 |
| | | | 205/503 |
| 5,753,098 A | 5/1998 | Bess et al. | |
| 2005/0217991 A1* | 10/2005 | Dahlquist, Jr. | C25B 15/00 |
| | | | 204/267 |
| 2012/0247959 A1* | 10/2012 | Seed | C02F 1/4691 |
| | | | 204/554 |
| 2015/0144499 A1 | 5/2015 | Benedetto | |
| 2016/0251763 A1 | 9/2016 | Benedetto | |

OTHER PUBLICATIONS

International Preliminary Report on Patentability for Corresponding International Application No. PCT/IB2017/057644 (dated Mar. 22, 2019) (14 Pages).

* cited by examiner

ELECTRODIC SUPPORT STRUCTURE FOR COAXIAL ELECTROLYTIC CELLS

This application is a U.S. national stage of PCT/IB2017/057644 filed on Dec. 5, 2017 which claims the benefit of priority from Italian Patent Application No. 102016000123656 filed Dec. 6, 2016 the contents of each of which are incorporated herein by reference.

FIELD OF THE INVENTION

The invention relates to a support structure for electrodes, which are homothetic to each other, intended to function in coaxial electrolytic and/or concentric cells.

PRIOR ART

The electrolytic coaxial and/or concentric cells equipped with opposing electrodes of the same surface area, such as for example the electrolytic cells described in patent applications WO2013189670 and WO2015082527, envisage the use of at least two electrodic pairs: an outer pair and an inner pair. Each of these electrodic pairs is divided into a first and a second electrode of the same dimensions having side edges that are facing and electrically insulated from each other. The electrolytic reaction in this type of cell ideally takes place between each electrode of the outer electrodic pair and the electrode of the inner electrodic pair facing thereto. No reaction should however occur between the first and the second electrode of each electrodic pair.

In the coaxial cells described above, suitable for operating in monopolar or bipolar configuration and for use in electrochemical processes carried out with periodic polarity inversion, each electrode is typically positioned within a structure comprising a support base made of electrically insulating material provided with suitable housing seats.

In order to ensure optimal cell function, when inserted in its housing, each electrode must be electrically insulated along the portions of the exposed side edges in order to eliminate or reduce eddy currents and inter-electrode shorts. An upper plate of insulating material, also typically provided with electrode support means, is positioned above the same in order to ensure a mechanically stable positioning and to guarantee an, at least partial, insulation of the upper edges of the electrodes.

Assembly of the system described above is often a long and laborious operation. Indeed, since the electrodes lack an appropriate side support, the anodes and the cathodes positioned in the housing seats are generally subject to small variations of position that are sufficient to hinder cell closure, due to misalignment of the upper plate support means and the edge of the electrodes that correspond thereto.

It has also been observed that, in the coaxial electrolytic cells of the prior art, due to the non-planar shape of the electrodes, it is sometimes difficult to insert them into the respective housing seats.

Consequently, the assembly of coaxial electrolytic cells in general is inconvenient, laborious and time-consuming.

It is therefore desirable to have an electrodic support structure that overcomes the drawbacks of the prior art, in particular that simplifies and facilitates the cell assembly operations through better control of the position of the electrodes, so as to ensure a predetermined position thereof and guarantee inter-electrode distance control. It is therefore also desirable to have an electrodic support structure that allows facilitated access to the housing seats and at the same time guarantees electrical insulation of the side edges of the electrodes, without the need for dedicated intervention on the edges of each electrode.

SUMMARY OF THE INVENTION

Various aspects of the present invention are set out in the appended claims.

Under one aspect, the invention relates to an electrodic support structure for coaxial electrolytic cells suitable for containing a plurality of electrodes and comprising: i) a support plane made of insulating material provided with a plurality of housing seats suitable for housing said plurality of electrodes and ii) a partition member made of insulating material arranged orthogonally to the support plane. The partition member according to the present invention is provided with a plurality of positioning means suitable for positioning, driving or supporting the plurality of electrodes in a direction orthogonal to the support plane, when the cell anodes and cathodes are housed in the housing seats of the support plane.

The term support plane means a member made of an electrically insulating material suitable for not becoming degraded when immersed in electrolytic solutions for the production of oxidizers, alkaline pH or acid pH, and equipped with at least one flat surface where the aforementioned housing seats are arranged.

The partition member described above can be integral with the support plane, it can for example be made by means of extrusion techniques or with the use of traditional moulds; alternatively, it can also be manufactured in one piece, for example by machining from solid or using a 3D printer. The partition member can also be a member that is physically separate with respect to the support plane, provided that is suitable for mechanically connecting thereto. For example, the partition member can be suitable for adhering to the support plane by virtue of its geometry and/or of any external forces (gravity or pressure), or be connected thereto via fixing or coupling means.

It is observed that the plurality of electrodes to which reference is made, being intended for coaxial electrolytic cells, envisages that each electrode be contained or contain at least one additional electrode, the term "contain" herein in fact relating to the convex envelope that encases each electrode.

The term "seat" shall mean one or more means suitable for housing, bearing or supporting the plurality of electrodes in the support plane. Each seat can for example comprise one or more brackets, clips, one or more L-shaped profiles and/or one or more grooves or other fixing or support means.

The term "positioning means" shall mean one or more means placed on said partition member suitable for driving, housing, bearing or positioning the plurality of electrodes orthogonally with respect to the support plane. Each positioning means can for example comprise one or more saddles, one or more L-shaped profiles and/or one or more grooves or other fixing or positioning means.

The electrodic support structure according to the present invention can have the advantage of facilitating the assembly operations of the coaxial electrolytic cells, in particular coaxial cells equipped with opposing electrodes of the same surface area or coaxial cells where the electrodes are arranged homothetically to each other and do not have a closed cross-section in the support plane. In fact in these cases, the partition member according to the invention can facilitate the insertion of the electrodes into their housing seats and support or constrain them in the direction orthogonal to the support plane, thus preventing (or attenuating) the oscillations of the electrodes and the possible displacement thereof during assembly of the electrolytic cell. Moreover, the partition member can contribute to electrically insulating the side edges of the electrodes, reducing the risk of eddy currents, electrical edge effects and/or inter-electrode shorts.

In one embodiment, the housing seats for electrodes of the electrodic support structure are grooves. Each groove is arranged so that at least one end thereof is located at the at least one positioning means of the partition member. The positioning means can optionally be a slit arranged orthogonally with respect to the support plane.

The expression "located at" shall mean that the end of the groove is at least in part located in the area identified by the orthogonal projection over the support plane of a positioning means of the partition member.

This arrangement can have the advantage of further facilitating the insertion of the plurality of electrodes into their seats. During assembly, at least one edge of each electrode is inserted into a slit in the partition member (or in other positioning means thereof) and is driven orthogonally to the support plane in a housing seat consisting of a suitably shaped groove. In this case, it can be advantageous for each slit to penetrate inside the partition member in the direction of the tangent to the housing seat at the point in which they intersect, so as to house the non-planar electrode enveloping the shape.

In addition, or alternatively, the vertical slits of the partition member can have a tapered section, so as to further facilitate the insertion of the electrode and more effectively hold it in position.

In one embodiment, the plurality of housing seats of the electrodic support structure according to any embodiment of the invention comprises a plurality of grooves having a shape homothetic to each other (direct or inverse). In a further embodiment of the invention, the partition member of the electrodic support structure has a composite and continuous shape that is optionally symmetrical with respect to a vertical axis that crosses its centre and comprising a right-angled prism member equipped with a circular, elliptical, oval or polygonal-shaped base having central symmetry. In this embodiment, the prism member is oriented with the base parallel to the support plane and placed at the centre of the base of said partition member. The base of the said right-angled prism member can be advantageously selected so as to have a peripheral shape similar or homothetic to said plurality of electrodes. In particular, according to one embodiment, the electrodic support structure has at least one housing seat arranged along a portion of the edge of the base of the said right-angled prism member. This arrangement can have the advantage of guaranteeing that the surface of the internal electrode directly in front of the partition member is almost in contact therewith and does not therefore have or reduces the possible electrochemical activity thereof due to its consequent insulation from the surrounding environment.

According to a further embodiment of the invention, the partition member has at least one through hole through its two opposite surfaces such as to allow the passage of the electrolytic solution therethrough. For example, the partition member can have at least one through hole through the surfaces parallel to the support plane. In this case, the support plane can advantageously have at least one opening at said at least one through hole. The opening and the through hole can be sized so as to prevent floating of the electrodic support structure when it is immersed in the electrolyte. For this purpose, the prism member, where present, can be made hollow, with the cavity placed at an opening in the support plane.

Alternatively, the partition member can have at least one through hole through its thickness to allow the flow of electrolyte between sections of the cell separated by said partition member.

According to one embodiment, the electrodic housing seats on the support plane are intercalated by one or more through openings so as to allow the passage of an electrolytic solution through the support plane.

According to a further embodiment of the invention, the support plane is provided with at least two pairs of housing seats, comprising:
  i) an external pair of housing seats subdivided into a first external housing seat and a second external housing separated by the partition member according to any embodiment of the invention and suitable for housing a pair of electrodes of the same dimensions;
  ii) an internal pair of housing seats subdivided into a first internal housing seat and a second internal housing seat, said first and said second internal housing seat being suitable for housing a pair of electrodes of the same dimensions and being separated from each other by said partition member.

This embodiment can have the advantage of being arranged to also house pairs of opposing electrodes of the same dimensions, such as for example the electrodes for coaxial cells described in patent applications WO2013189670 and WO2015082527. According to a further aspect, the invention relates to a coaxial electrolytic cell comprising the members (a)-(d) listed below:
(a) the electrodic support structure according to any one of the embodiments described above;
(b) a plurality of electrodes inserted into the aforementioned electrodic support structure, the electrodes being housed perpendicularly to the support plane in the plurality of housing seats thereof and positioned in the plurality of positioning means of the partition member;
(c) an, optional, insulating containing plane arranged parallel to said support plane;
(d) at least one side containing wall, integral with or connected to the support plane and orthogonal thereto, and integral with or connected to said containing plane and orthogonal thereto;

The system comprising the members (a)-(d) is configured so that the partition member of the support plane and the plurality of electrodes are contained within the volume defined by the electrodic support structure, any insulating containing plane and the at least one side containing wall.

The insulating containing plane can optionally be provided with fixing seats for fixing the exposed edges of the plurality of electrodes parallel to the support plane. The insulating containing plane, when present, can also be optionally provided with one or both of the following members: i) conductive inserts or openings suitable for supplying electricity to the plurality of electrodes of the cell, ii) at least one inlet opening and at least one outlet opening for circulating an electrolytic solution within the system comprising the members (a)-(d) described above.

According to one embodiment of the coaxial electrolytic cell described above, the support plane of the system comprising members (a)-(d) includes a further member (e) consisting of:
(e) at least one vertical support wall made of an insulating material, that is continuous or provided with through holes, suitable for keeping the system (a)-(d) described above raised. By keeping the system (a)-(d) raised, the member (e) can have the advantage of providing a volume of space suitable for the containment and/or the passage of further electrolytic solution. This can allow cell performance to be increased, thus increasing the volume of the liquid processed. For example, in the case in which the system (a)-(d) is immersed in a further device containing an electrolytic solution, the member (e), suitably provided with holes, can have the advantage of promoting the passage and the circulation of electrolytic solution in the system (a)-(d) through the support plane, keeping the latter raised and immersed in the solution.

The following drawings are included to demonstrate particular embodiments of the invention, the feasibility of which has been thoroughly verified in the set of claimed embodiments. A person skilled in the art must, in the light of the present description, appreciate that many changes can be made to the specific embodiments disclosed while still obtaining a similar or analogous result without departing from the scope of the invention.

In the drawings, unless otherwise indicated, the same numbers correspond to members that have the same or equivalent functions. The drawings are not to scale.

DETAILED DESCRIPTION OF THE DRAWINGS

Figure 1:
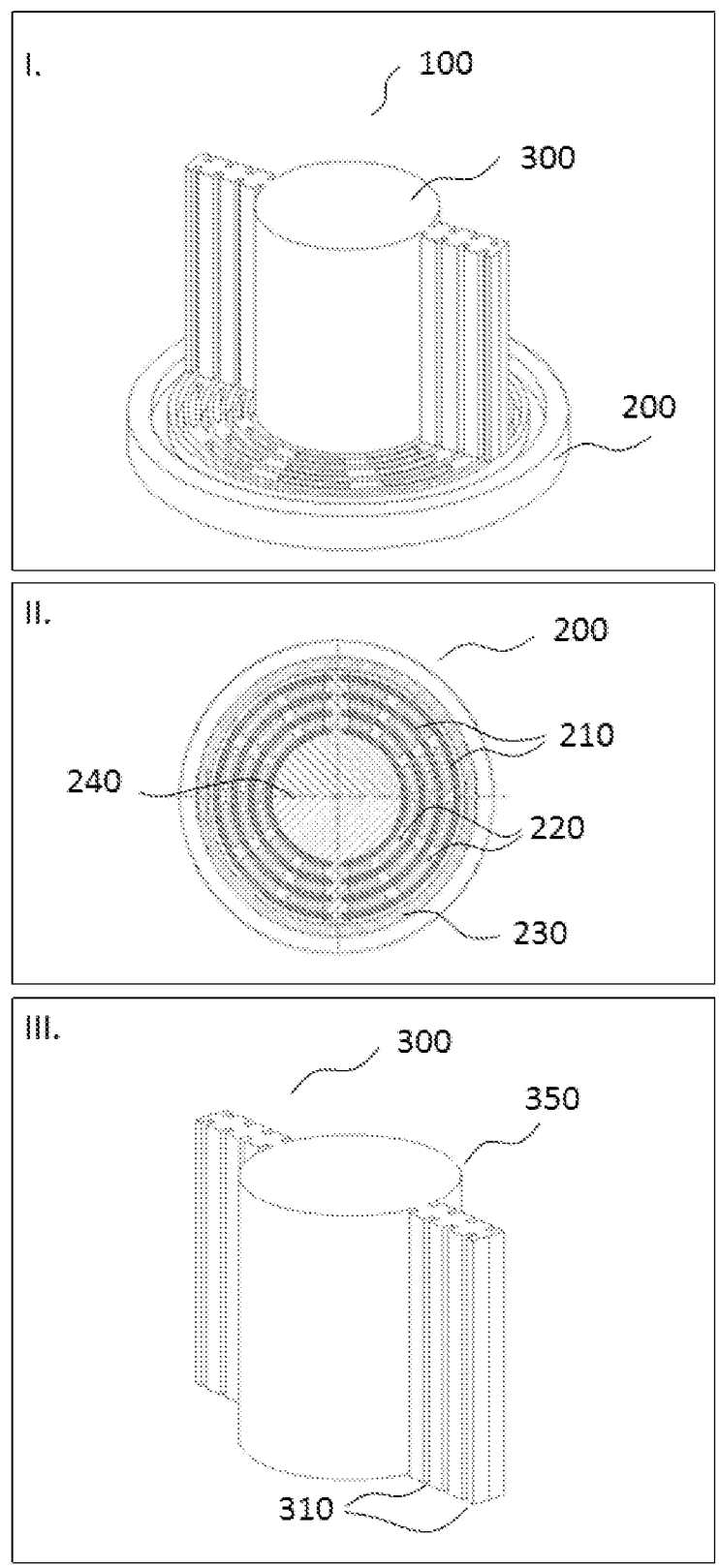
FIG. 1 illustrates an electrodic support structure according to one embodiment of the invention.

FIG. 1, panel I, shows a general view of an electrodic support structure (100) according to one embodiment of the invention and comprising a support plane (200) and a partition member (300) both made of insulating material.

The panel II provides an illustration of a top view of the support plane (200), which is provided with grooves (210) suitable for housing a plurality of electrodes arranged homothetically to each other. The support plane is also optionally provided with through openings (220) intercalated to the grooves (210) and with a seat (230) suitable for housing an optional side containing wall (not shown). The space (240) is instead shaped so as to house the partition member made of insulating material (300).

The panel III illustrates the partition member made of insulating material (300), provided with slits (310). In this embodiment, the partition member is equipped with composite shape comprising a right-angled prism member (350) having a cylindrical shape, suitable for being placed in a position that is close or adherent to the edge of the internal grooves of the support plane (200).

Figure 2:
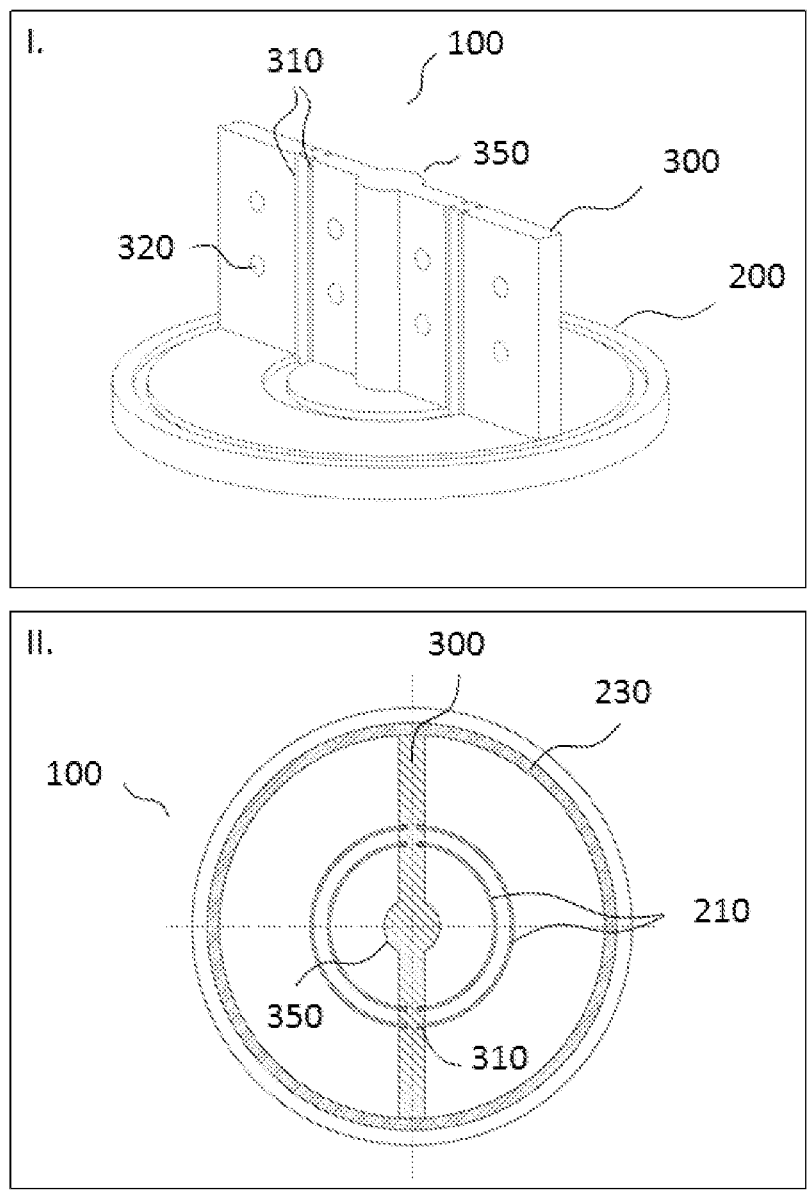
FIG. 2 illustrates an electrodic support structure according to one embodiment of the invention.

FIG. 2, panel I, shows a general view of an electrodic support structure (100) according to one embodiment of the invention and comprising a support plane (200) and a partition member (300) both made of insulating material.

The partition member (300) comprises some slits (310), a right-angled prism member (350) having a cylindrical shape, some through (320) holes through the larger surface of the partition member orthogonal to the support plane. The panel II, shows a top view of the support structure (100) of the panel I. In the support plane (200), the housing seats (210) for electrodes, and the seat (230) suitable for housing an optional side containing wall (not shown), are identifiable. Also identifiable in the partition member is the profile of the slit (310), which in this embodiment is oriented in a tangential direction with respect to the groove (210) corresponding thereto, so as to facilitate the insertion of the electrode, which in this configuration must have a semicircular shape.

Figure 3:
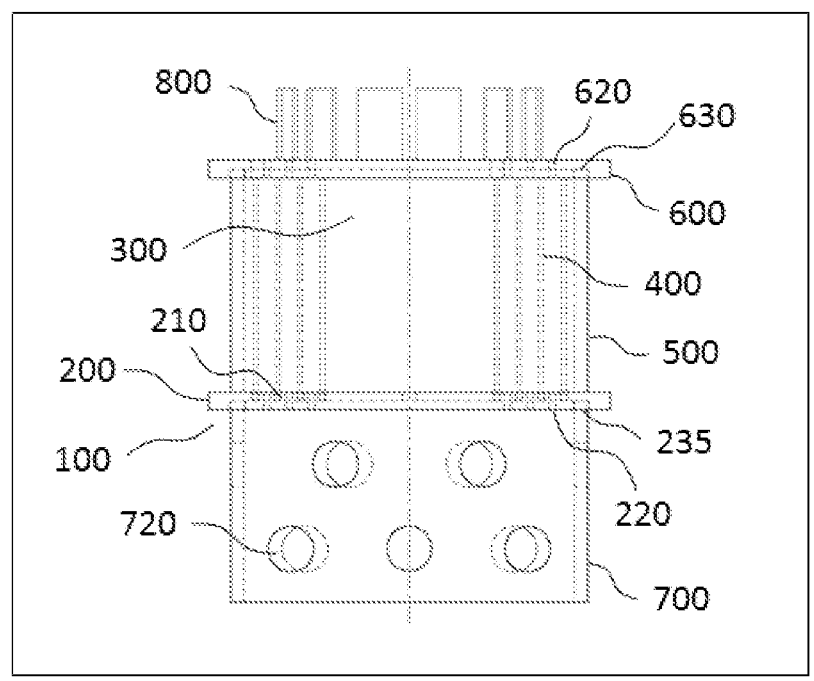
FIG. 3 illustrates a coaxial electrolytic cell according to one embodiment of the invention.

FIG. 3 shows some components of an undivided monopolar or bipolar cell for gas lifting processes (natural circulation by effect of the gas produced at the surface of the electrodes) according to one embodiment of the present invention that employs the support structure (100) already described in FIG. 1, equipped with a support plane (200) and a partition member (300) that is orthogonal thereto. The support plane (200) is provided with grooves (210) for housing the electrodes (400) having a shape homothetic to each other and through holes (220) intercalated to said grooves. The cell also comprises a side containing wall (500), which in this embodiment has a cylindrical and hollow geometry. The electrolytic cell further comprises an insulating containing plane (600), suitable for delimiting the upper volume of the area containing the electrodes and suitable for insulating the upper edges thereof. The insulating containing plane is in this embodiment provided with through holes (620) that allow the electrical connection of the electrodes to an external power supply system through the contacts (800) and of further through holes (not shown in the drawing) able to allow the passage of electrolytic solution through the plane.

The insulating containing plane (600) is also provided with a groove (630) that meets with the edge of the side containing wall (500), so as to confine the volume of the cell in which the electrolytic reaction takes place and allow good electrolyte circulation.

The support plane (200) is placed above a further wall (700), a seat (235) suitable for housing the wall (700), provided with holes (720), to allow the upward circulation of the electrolytic solution of the electrolyser. The electrolyser will comprise the components illustrated herein and arranged as described, and at least one further container suitable for enclosing or circulating the electrolyte.

Figure 4:
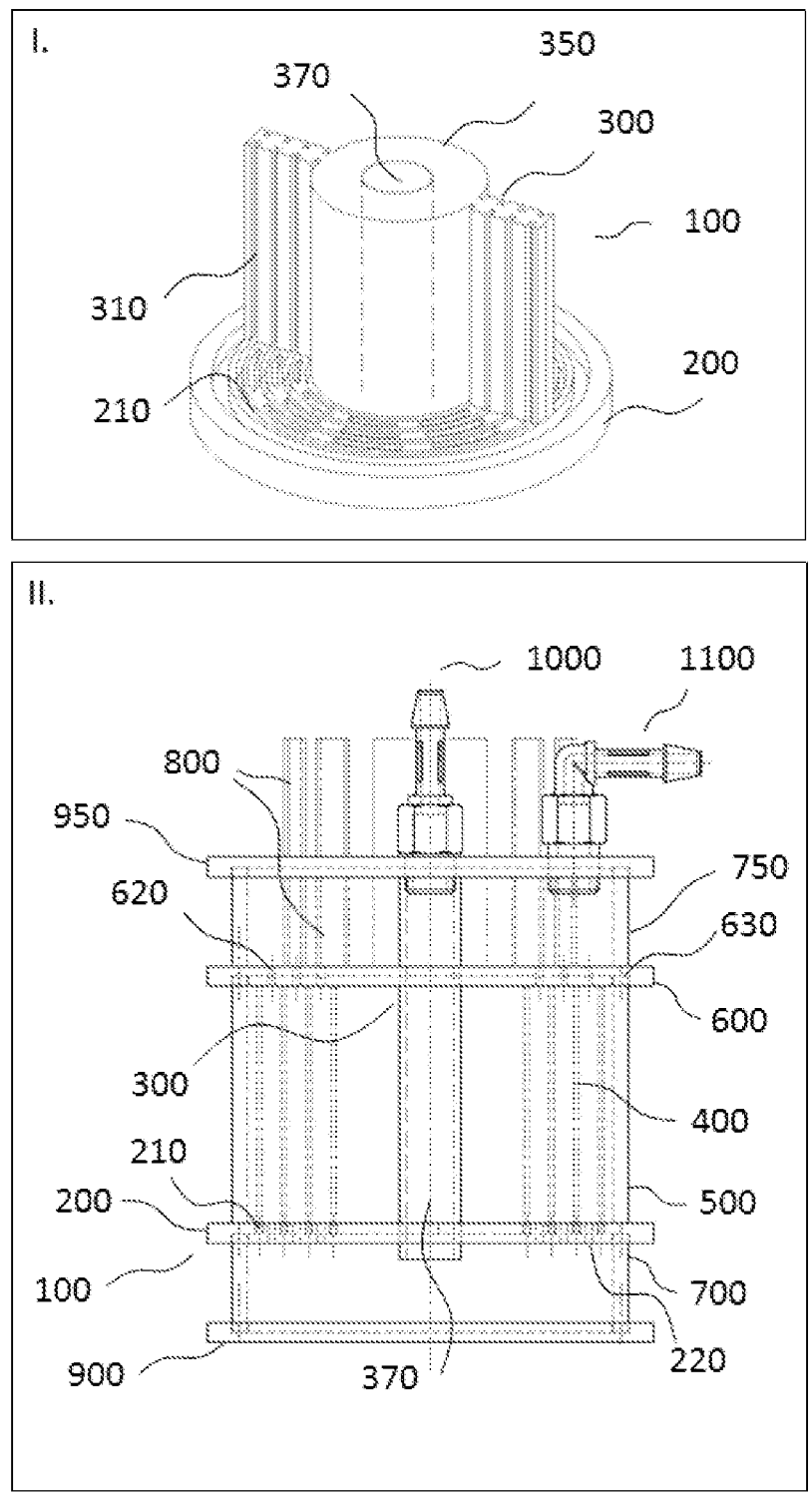
FIG. 4 illustrates an electrodic support structure and a coaxial electrolytic cell according to some embodiments of the invention.

FIG. 4 shows some components of an undivided monopolar or bipolar cell according to one embodiment of the present invention. The cell employs the electrodic support structure (100) schematically illustrated in panel I and comprising the support plane (200) provided with grooves for electrodes having the shape of the arc of a circle (210), the partition member (300), a cross section of which is shown. The latter is provided with electrode insertion and support means in the form of slits (310), of a prism member (350), shown here in cross section, of cylindrical shape and equipped with a through hole (370) that also crosses the support plane (200).

With reference to the panel II, the electrodes (400) of the electrolytic cell, arranged in the grooves (210) of the support structure (100), are inserted into a central chamber comprised between the support plane (200), the side containing wall (500) and the insulating containing plane (600). The latter is in turn equipped with a groove (630) to house the edge of the wall (500). The system described herein is raised and rests on the wall (700), which defines a lower chamber that is closed by the base (900). The system described above is surmounted by an upper chamber delimited by the containing plane (600), the wall (750) and the cover (950).

The electrical connection of the electrodes to an external power supply system takes place by means of the contacts (800), which pass through the surfaces (950) and (600) by means of suitable through holes (not shown in the drawing).

It is observed that the prism member (300) extends above and below the support plane (200) in all three of the chambers described above. The prism member (300) is provided with a through hole (370) suitable for placing in communication the intake (1000) of the electrolyte with the lower chamber directly. The electrolyte reaches the central chamber in which the electrolytic reaction takes place through the through holes (220) made on the support plane (200) and crosses it, reaching the upper chamber through the through holes (620) made on the containing plane (600). The solution is thus drawn toward the outside through the outlet (1100).

Figure 5:
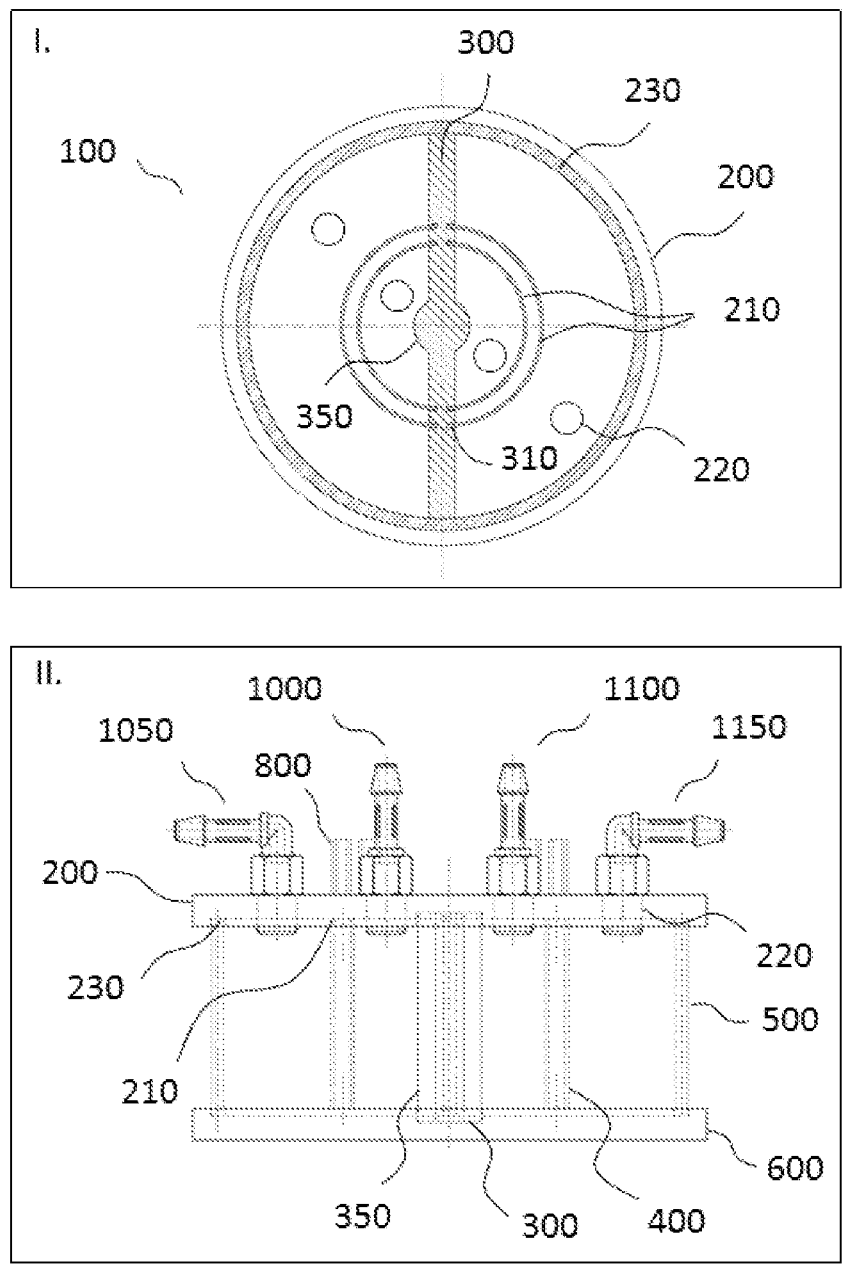
FIG. 5 illustrates an electrodic support structure and a coaxial electrolytic cell according to some embodiments of the invention.

FIG. 5, panel I, shows a front view of an electrodic support structure (100) according to the invention, suitable for being employed in the divided monopolar cell illustrated in panel II. The electrodic support structure is equipped with a support plane (200) provided with semi-circular shaped grooves (210), to house analogous shaped electrodes, and four through holes (220) suitable for allowing the inlet and outlet of the electrolytic solution. Through holes (not shown) are made at the grooves (210), to allow the electrical connection of the electrodes to the power supply. The partition member (300) is equipped with holes that pass through its major surfaces (such as the partition member of FIG. 2) and is provided with vertical slits (310) placed at each end of the grooves (210). Said slits have a curved profile having the same radius of curvature as the grooves to which they correspond, so as to facilitate the insertion of the semi-circular electrode while enveloping the shape. Panel II shows a side view of a double coaxial cell that is monopolar and divided according to one embodiment of the present invention. The cell, which allows the production of two different solutions, an anolyte and a catholyte having different composition and pH, integrates the electrodic support structure (100) illustrated in the panel (I). The side containing wall (500), which rests on the support plane (200), is connected to the support plane (600). The intakes (1000, 1050) and the relative outlets (1100, 1150), allow circulation of the catholyte and anolyte, through the through holes (220), in the two areas of the cell delimited by the electrodes (400) corresponding thereto. A suitably supported membrane or diaphragm can be positioned between the electrodes. Both the anolyte and the catholyte pass through the partition member (300) through the through holes made therein. The electrodes are supplied with electricity through the contacts (800).

Figure 6:
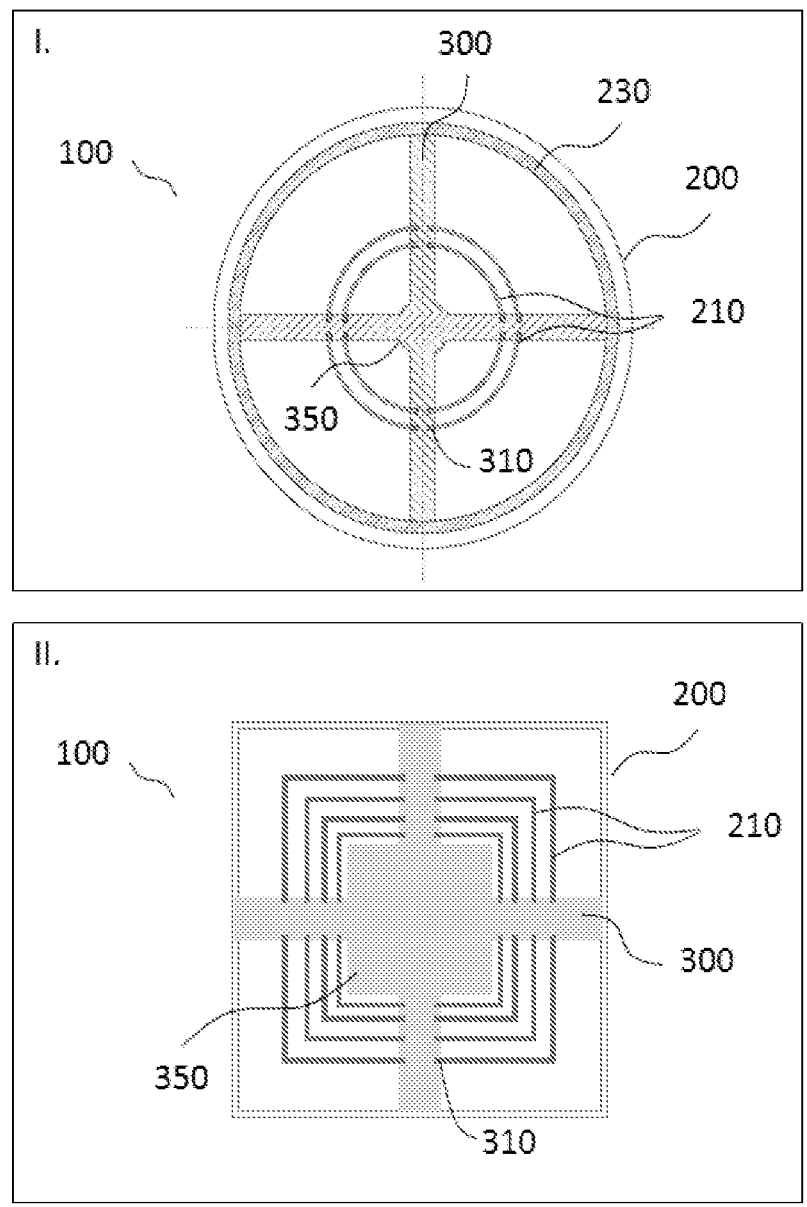
FIG. 6 illustrates an electrodic support structure according to one embodiment of the invention.

FIG. 6 illustrates two possible embodiments of the support structure (100) according to the invention. Panels I and II both have a partition member (300) made so as to subdivide the support plane (200) into an even number of areas for housing of electrodes in their seats (210) that is greater than two. The partition member further comprises some slits (310) arranged along a direction defined by the straight line tangent at the end of the groove of the support plane corresponding thereto. In panel II, the central prism member (350) has a square cross section and is placed close to the edge of the housing seats of lower length.

The foregoing description does not intend to limit the invention, which can be used according to different embodiments without thereby departing from the objects and the extent of which is uniquely defined by the appended claims.

In the description and claims of the present application, the word "comprise" and variations thereof such as "comprising" and "comprises" do not exclude the presence of other additional members, components or process stages.

The discussion of documents, records, materials, apparatus, items and the like is included in the text for the sole purpose of providing a context for the present invention; it is not however to be understood that this matter or part thereof constitutes a general knowledge in the field of the invention prior to the date of priority of each of the claims appended to the present application.

The invention claimed is:

1. An electrodic support structure for coaxial electrolytic cells suitable for housing a plurality of electrodes comprising:
   a support plane made of insulating material provided with a plurality of housing seats suitable for housing said plurality of electrodes; and
   a partition member made of insulating material integral with or mechanically connected to said support plane; said partition member being a composite and continuous shaped member comprising a right-angled prism member equipped with a circular, elliptical, oval or polygonal shaped base with central symmetry; said right prism member having said base oriented in parallel to said support plane and being positioned at the centre of the base of said partition member placed at said support plane and being arranged orthogonally to said support plane; said partition member being provided with a plurality of positioning means suitable for positioning said plurality of electrodes,
   at least one housing seat of said plurality of housing seats being arranged along an edge portion of said base of said right-angled prism member,
   wherein the support plane further comprises
      an external pair of housing seats, said external pair being divided into a first external housing seat and a second external housing seat, said first and said second external housing seats being suitable for housing a first pair of the plurality of electrodes of the same dimensions, said first and said second external housing seats separated from each other by said partition member; and
      an internal pair of housing seats, said internal pair being divided into a first internal housing seat and a second internal housing seat, said first and said second internal housing seats being suitable for housing a second pair of plurality of electrodes of the same dimensions, said first and said second internal housing seats separated from each other by said partition member.

2. The electrodic support structure according to claim 1, wherein each housing seat comprises a groove and said partition member has at least one positioning means arranged at at least one end of each of said groove.

3. The electrodic support structure according to claim 2, wherein said positioning means are slits orthogonal to said support plane, each slit arranged at one end of one of said plurality of housing seats, each slit penetrating into said partition member in the direction of the tangent of said housing seat at the said end thereof.

4. The electrodic support structure according to claim 1, wherein said plurality of housing seats comprises a plurality of grooves, having a shape homothetic to each other.

5. The electrodic support structure according to claim 1, wherein said partition member has at least one through hole through two opposite surfaces thereof, said at least one through hole being suitable for the passage of electrolytic solution.

6. The electrodic support structure according to claim 1, wherein at least two housing seats of said plurality of housing seats are intercalated by one or more openings that pass through said support plane.

7. A coaxial electrolytic cell comprising:

the electrodic support structure according to claim 1;

an insulating containing plane arranged parallel to said support plane;

at least one containing side wall integral with or connected to said support plane and integral with or connected to said insulating containing plane and orthogonally interposed thereto; and a plurality of electrodes housed in said plurality of housing seats and positioned in said plurality of positioning means of said electrodic support structure;

said partition member and said plurality of electrodes being contained within the system comprising said electrodic support structure, said containing plane and said at least one containing side wall.

8. The coaxial electrolytic cell according to claim 7, wherein said insulating surface is provided with:

at least one inlet opening and at least one outlet opening for circulating an electrolytic solution within the system comprising said electrodic support structure, said insulating surface and said at least one side containing wall, and a plurality of openings suitable for the passage of one or more electrical connections for supplying electricity to said plurality of electrodes.

\* \* \* \* \*